(12) United States Patent
Chen

(10) Patent No.: US 12,067,202 B2
(45) Date of Patent: Aug. 20, 2024

(54) TOUCH DISPLAY PANEL AND DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Bi Chen, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/600,023

(22) PCT Filed: Jun. 25, 2021

(86) PCT No.: PCT/CN2021/102446
§ 371 (c)(1),
(2) Date: Dec. 8, 2022

(87) PCT Pub. No.: WO2022/252313
PCT Pub. Date: Dec. 8, 2022

(65) Prior Publication Data
US 2024/0045553 A1 Feb. 8, 2024

(30) Foreign Application Priority Data
May 31, 2021 (CN) .......................... 202110598215.8

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01)

(58) Field of Classification Search
None
See application file for complete search history.

(56) References Cited

U.S. PATENT DOCUMENTS

2015/0185928 A1 7/2015 Son et al.
2016/0328057 A1* 11/2016 Chai ..................... G06F 3/0412
(Continued)

FOREIGN PATENT DOCUMENTS

| CN | 108319392 A | 7/2018 |
|---|---|---|
| CN | 207924639 U | 9/2018 |

(Continued)

OTHER PUBLICATIONS

Chinese Office Action issued in corresponding Chinese Patent Application No. 202110598215.8 dated Mar. 3, 2022, pp. 1-10.
(Continued)

*Primary Examiner* — Robin J Mishler
(74) *Attorney, Agent, or Firm* — PV IP PC; Wei Te Chung; Zhigang Ma

(57) ABSTRACT

The present application provides a touch display panel and a display device. The touch display device includes a functional composite layer. The functional composite layer includes a touch pattern area and an antenna pattern area. A touch pattern is arranged in the touch pattern area, and the antenna pattern is arranged in the antenna pattern area. The antenna pattern and the touch pattern are arranged in a same layer, and the antenna pattern is electrically insulated from the touch pattern, so that the present application avoids placing the antenna pattern in a middle frame of the display device and improves lightness and thinness of the display device.

18 Claims, 4 Drawing Sheets

(56) References Cited

U.S. PATENT DOCUMENTS

| | | | | |
|---|---|---|---|---|
| 2017/0139520 | A1* | 5/2017 | Yeh | .......................... H01Q 9/30 |
| 2018/0314369 | A1* | 11/2018 | Yashiro | .................. H01Q 1/243 |
| 2020/0363905 | A1 | 11/2020 | Jo et al. | |
| 2021/0200379 | A1* | 7/2021 | Youk | ...................... G06F 3/0412 |
| 2021/0303122 | A1* | 9/2021 | Ko | ........................ G06F 3/0412 |

FOREIGN PATENT DOCUMENTS

| | | |
|---|---|---|
| CN | 109992143 A | 7/2019 |
| CN | 110034161 A | 7/2019 |
| CN | 111007953 A | 4/2020 |
| CN | 111427208 A | 7/2020 |
| CN | 111857430 A | 10/2020 |
| CN | 111930264 A | 11/2020 |
| CN | 112578925 A | 3/2021 |
| CN | 112578926 A | 3/2021 |
| CN | 112612374 A | 4/2021 |
| CN | 112732112 A | 4/2021 |

OTHER PUBLICATIONS

International Search Report in International application No. PCT/CN2021/102446, mailed on Feb. 28, 2022.
Written Opinion of the International Searching Authority in International application No. PCT/CN2021/102446, mailed on Feb. 28, 2022.

* cited by examiner

TOUCH DISPLAY PANEL AND DISPLAY DEVICE

RELATED APPLICATIONS

This application is a Notional Phase of PCT Patent Application No. PCT/CN2021/102446 having international filing date of Jun. 25, 2021, which claims the benefit of priority of Chinese Patent Application No. 202110598215.8 filed on May 31, 2021. The contents of the above applications are all incorporated by reference as if fully set forth herein in their entirety.

FIELD OF DISCLOSURE

The present application relates to a field of display technology and in particular, to a touch display panel and a display device.

DESCRIPTION OF RELATED ART

At present, touch technology has been widely used in display parts of various electronic devices, so users can operate the electronic devices by touch. In addition, with the development of information and communication technology, electronic devices with wireless communication functions, such as mobile phones, tablet computers, and portable computers, have become indispensable equipment in people's daily lives. Generally, electronic devices with wireless communication functions need to include an antenna and a wireless signal processing module. The antenna is configured as a wireless signal transceiving component, and is usually installed on a circuit board of the electronic device or added on an inner surface of a housing.

However, there has been a growing trend for electronic devices toward lightness, thinness, and high integration. Because conventional touch display panels do not have transmitting and receiving functions of antennas, antenna components need to be integrated in a middle frame to be a separate antenna module. The middle frame needs to have a segmented design in order to integrate the antenna. This occupies a space inside the electronic device, affects an internal circuit layout, makes it impossible to further reduce a thickness of the electronic device, and also increases assembly steps and material costs of the electronic device.

Therefore, there is an urgent need to provide a touch display panel and a display device which can solve the above technical problem.

SUMMARY

There is a technical problem with conventional touch display panels that antenna components need to be integrated in a middle frame of the conventional touch display panels and thus occupy an internal space of a display device.

The present application provides a touch display panel, comprising:

a display layer and a functional composite layer disposed on the display layer, wherein the functional composite layer comprises a touch pattern area and an antenna pattern area;

wherein the touch pattern area is provided with a touch pattern, the antenna pattern area is provided with an antenna pattern, the antenna pattern and the touch pattern are arranged in a same layer, and the antenna pattern is electrically insulated from the touch pattern.

In the touch display panel according to one embodiment of the present application, the touch display panel comprises a display area and a non-display area arranged around the display area, and the touch pattern extends from the display area to the non-display area; and the touch pattern comprises a plurality of touch electrode groups, the plurality of touch electrode groups are arranged along a first direction, and a portion of the antenna pattern is located between two adjacent touch electrode groups.

In the touch display panel according to one embodiment of the present application, a plurality of touch electrodes in each of the touch electrode groups are arranged along a second direction, and the touch electrodes in each of the touch electrode groups are electrically insulated from each other;

the touch pattern further comprises a plurality of touch lines, each two adjacent ones of the touch lines are electrically insulated from each other, and one of the touch lines is arranged corresponding to one of the touch electrode groups and electrically connected to one of the touch electrodes in the corresponding touch electrode group; and the touch lines are arranged between two adjacent touch electrode groups, and the touch lines are electrically insulated from the antenna pattern.

In the touch display panel according to one embodiment of the present application, the antenna pattern comprises a plurality of antenna lines, and each of the antenna lines is arranged corresponding to and electrically insulated from one of the touch lines.

In the touch display panel according to one embodiment of the present application, in the display area, each touch line comprises a plurality of first touch connection sections and a plurality of second touch connection sections electrically connected to the plurality of first touch connection sections, and the first touch connection sections are arranged along the first direction; one of the first touch connection sections is electrically connected to one of the touch electrodes in the corresponding touch electrode group, the second touch connection sections are arranged along the second direction, and each two adjacent first touch connection sections are electrically connected through one of the second touch connection sections;

in the display area, each antenna line comprises a first antenna connection section, and the first antenna connection section extends in a direction opposite to the second direction; and each first antenna connection section is arranged corresponding to and electrically insulated from the corresponding second touch connection section.

In the touch display panel according to one embodiment of the present application, in the non-display area, each touch line comprises the plurality of second touch connection sections, each antenna line comprises a second antenna connection section, and the second antenna connection sections are arranged in a loop around a periphery of the display area.

In the touch display panel according to one embodiment of the present application, in the display area, a distribution density of the touch lines gradually increases along the second direction, and a distribution density of the antenna lines gradually increases along a direction opposite to the second direction.

In the touch display panel according to one embodiment of the present application, in the display area, the touch pattern and the antenna pattern both comprise a plurality of grid pattern unit groups, each grid pattern unit group comprises four grid pattern units arranged in an array, the grid pattern units share a first unit connection section, the first unit connection section comprises a first sub-unit connection section and a second sub-unit connection section, and the first sub-unit connection section and the second sub-unit connection section are electrically insulated from each other; and the touch display panel comprises a plurality of sub-pixels, the sub-pixels comprise a plurality of first sub-pixels and a plurality of second sub-pixels with a different color from the first sub-pixels, each of the grid pattern units surrounds one of the first sub-pixels, and each of the grid pattern unit groups surrounds one of the second sub-pixels.

In the touch display panel according to one embodiment of the present application, a size of each second sub-pixel is smaller than a size of each first sub-pixel, and a portion of the touch pattern or a portion of the antenna pattern arranged around the second sub-pixels has a distribution density greater than a distribution density of a portion of the touch pattern or a portion of the antenna pattern arranged around the first sub-pixels.

In the touch display panel according to one embodiment of the present application, in the display area, the touch display panel further comprises: a substrate, a thin film transistor (TFT) array layer disposed on the substrate, the display layer disposed on the TFT array layer, a thin film encapsulation layer disposed on the display layer, and an organic insulating layer disposed on the thin film encapsulation layer; and the functional composite layer is arranged between the thin film encapsulation layer and the organic insulating layer.

The present application further provides a display device, comprising:

a touch display panel, an antenna chip arranged on one side of the touch display panel, and a touch chip arranged between the touch display panel and the antenna chip;

wherein the touch display panel comprises a display layer and a functional composite layer disposed on the display layer, the functional composite layer comprises a touch pattern area and an antenna pattern area, the touch pattern area is provided with a touch pattern, the antenna pattern area is provided with an antenna pattern, the antenna pattern and the touch pattern are arranged in a same layer; and the antenna pattern and the touch pattern are electrically insulated from each other; and each of the touch lines is electrically connected to the touch chip, and each of the antenna lines is electrically connected to the antenna chip.

In the display device according to one embodiment of the present application, the touch display panel comprises a display area and a non-display area disposed around the display area, and the touch pattern extends from the display area to the non-display area; and the touch pattern comprises a plurality of touch electrode groups, the plurality of touch electrode groups are arranged along a first direction, and a portion of the antenna pattern is located between two adjacent touch electrode groups.

In the display device according to one embodiment of the present application, a plurality of touch electrodes in each of the touch electrode groups are arranged along a second direction, and the touch electrodes in each of the touch electrode groups are electrically insulated from each other;

the touch pattern further comprises a plurality of touch lines, each two adjacent ones of the touch lines are electrically insulated from each other, and one of the touch lines is arranged corresponding to one of the touch electrode groups and electrically connected to one of the touch electrodes in the corresponding touch electrode group; and the touch lines are arranged between two adjacent touch electrode groups, and the touch lines are electrically insulated from the antenna pattern.

In the display device according to one embodiment of the present application, the antenna pattern comprises a plurality of antenna lines, and each of the antenna lines is arranged corresponding to and electrically insulated from one of the touch lines.

In the display device according to one embodiment of the present application, in the display area, each touch line comprises a plurality of first touch connection sections and a plurality of second touch connection sections electrically connected to the plurality of first touch connection sections, and the first touch connection sections are arranged along the first direction; one of the first touch connection sections is electrically connected to one of the touch electrodes in the corresponding touch electrode group, the second touch connection sections are arranged along the second direction, and each two adjacent first touch connection sections are electrically connected through one of the second touch connection sections;

in the display area, each antenna line comprises a first antenna connection section, and the first antenna connection section extends in a direction opposite to the second direction; and each first antenna connection section is arranged corresponding to and electrically insulated from the corresponding second touch connection section.

In the display device according to one embodiment of the present application, in the non-display area, each touch line comprises the plurality of second touch connection sections, each antenna line comprises a second antenna connection section, and the second antenna connection sections are arranged in a loop around a periphery of the display area.

In the display device according to one embodiment of the present application, in the display area, a distribution density of the touch lines gradually increases along the second direction, and a distribution density of the antenna lines gradually increases along a direction opposite to the second direction.

In the display device according to one embodiment of the present application, in the display area, the touch pattern and the antenna pattern each comprise a plurality of grid pattern unit groups, each grid pattern unit group comprises four grid pattern units arranged in an array, the grid pattern units share a first unit connection section, the first unit connection section comprises a first sub-unit connection section and a second sub-unit connection section, and the first sub-unit connection section and the second sub-unit connection section are electrically insulated from each other; and the touch display panel comprises a plurality of sub-pixels, the sub-pixels comprise a plurality of first sub-pixels and a plurality of second sub-pixels with a different color from the first sub-pixels, each of the grid pattern units surrounds one of the first sub-pixels, and each of the grid pattern unit groups surrounds one of the second sub-pixels.

In the display device according to one embodiment of the present application, a size of each second sub-pixel is smaller than a size of each first sub-pixel, and a portion of the touch pattern or a portion of the antenna pattern arranged around the second sub-pixels has a distribution density greater than a distribution density of a portion of the touch pattern or a portion of the antenna pattern arranged around the first sub-pixels.

In the display device according to one embodiment of the present application, in the display area, the touch display panel further comprises: a substrate, a thin film transistor (TFT) array layer disposed on the substrate, the display layer disposed on the TFT array layer, a thin film encapsulation layer disposed on the display layer, and an organic insulating layer disposed on the thin film encapsulation layer; and the functional composite layer is arranged between the thin film encapsulation layer and the organic insulating layer.

Advantages of the present application:

In a touch display panel and a display device of the present application, a functional composite layer is disposed on a display layer. The functional composite layer comprises a touch pattern area and an antenna pattern area. The touch pattern area is provided with a touch pattern, the antenna pattern area is provided with an antenna pattern, the antenna pattern and the touch pattern are arranged in a same layer, and the antenna pattern is electrically insulated from the touch pattern. Such a configuration saves a space required for the antenna pattern, avoids placing the antenna pattern in a middle frame of the display device, enables the display device to have both an antenna function and a touch function, and at the same time, also improves lightness and thinness of the display device.

DETAILED DESCRIPTION OF EMBODIMENTS

Figure 1:
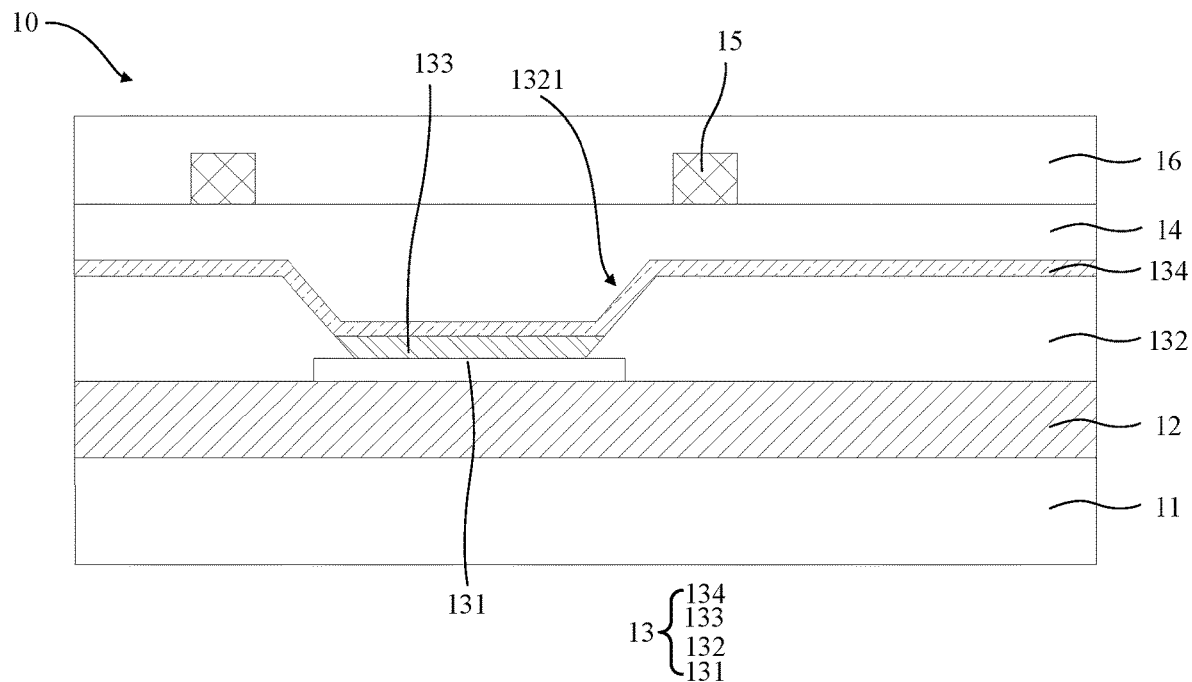
FIG. 1 is a schematic cross-sectional view illustrating a touch display panel according to a first embodiment of the present application.

The present application is directed to solving a technical problem in conventional touch display panels and conventional display devices that antenna components need to be integrated in a middle frame and thus occupy a space inside the display device. The present application can solve the above technical problem.

Please refer to FIGS. 1 to 6. The present application provides a touch display panel 10 and a display device. The touch display panel 10 comprises a display layer 13 and a functional composite layer 15 disposed on the display layer 13. The functional composite layer 15 comprises a touch pattern area and an antenna pattern area.

The touch pattern area is provided with a touch pattern 151, the antenna pattern area is provided with an antenna pattern 152, the antenna pattern 152 and the touch pattern 151 are arranged in a same layer, and the antenna pattern 152 is electrically insulated from the touch pattern 151.

The technical solutions of the present application are described in conjunction with specific embodiments.

First Embodiment

FIG. 1 shows a schematic cross-sectional view of the touch display panel 10 according to a first embodiment of the present application. The touch display panel 10 of the first embodiment of the present application comprises: a substrate 11, a thin film transistor (TFT) array layer 12 disposed on the substrate 11, a display layer 13 disposed on the TFT array layer 12, a thin film encapsulation layer 14 disposed on the display layer 13, a functional composite layer disposed on the thin film encapsulation layer 14, and an organic insulating layer 16 disposed on the thin film encapsulation layer 14 and completely covering the functional composite layer 15.

The functional composite layer 15 comprises a touch pattern area and an antenna pattern area. The touch pattern area is provided with a touch pattern 151, the antenna pattern area is provided with an antenna pattern 152, the antenna pattern 152 and the touch pattern 151 are arranged in a same layer, and the antenna pattern 152 is electrically insulated from the touch pattern 151.

In the present application, the substrate 11 can be a flexible substrate or a rigid substrate. The flexible substrate comprises, but is not limited to, a polyimide (PI) substrate, a cyclo-olefin polymer (COP) substrate, a polyethylene terephthalate (PET) substrate, and a flexible organic light-emitting diode (OLED) display. The rigid substrate comprises, but is not limited to, a glass substrate, a quartz substrate, a ceramic substrate, a plastic substrate, a thin film transistor (TFT) array substrate, a liquid crystal panel, and a rigid OLED substrate.

In the present application, the TFT array layer 12 is provided with various structural film layers such as TFTs, data lines, and scan lines. The TFTs comprise low temperature polysilicon TFTs, or indium gallium zinc oxide (IGZO) TFTs, or low-temperature oxide TFTs composed of both.

In the present application, the display layer 13 comprises an anode metal layer 131 disposed on the TFT array layer 12, a pixel definition layer 132 disposed on the TFT array layer 12 and partially covering the anode metal layer 131, an organic light emitting layer 133 disposed on the anode metal layer 131, and a cathode metal layer 134 disposed on the pixel definition layer 132 and completely covering the organic light emitting layer 133. The pixel definition layer 132 comprises an opening 1321, and the organic light emitting layer 133 is disposed in the opening 1321.

Further, the organic light emitting layer 133 comprises a hole transport layer (HTL), an emissive layer (EML), and an electron transport layer (ETL) which are made of organic materials. A material of the anode metal layer 131 is indium tin oxide or indium zinc oxide. The anode metal layer 131 is preferably an indium tin oxide layer, a silver metal layer, and an indium tin oxide layer that are stacked on each other. A thickness of the anode metal layer 131 ranges from 100 to 3000 angstroms. The pixel definition layer 132 comprise organic photoresists, and a thickness of the pixel definition layer 132 ranges from 5000 to 50000 angstroms. A material of the cathode metal layer 134 is magnesium-silver alloy, aluminum, indium tin oxide, or indium zinc oxide, and a thickness of the cathode metal layer 134 ranges from 100 to 3000 angstroms.

In the present application, the thin film encapsulation layer 14 is formed by overlapping inorganic/organic/inorganic multiple film layers. A main function of the inorganic film layer is to block entry of moisture and oxygen, and a main function of the organic layer is to cover particles generated in a previous manufacturing process and relieve a stress generated when the film layers are bent.

In the present application, the organic light emitting layer 133 comprises a plurality of juxtaposed sub-pixels, and each orthographic projection of the functional composite layer 15 projected on the thin film encapsulation layer 14 is located between two adjacent sub-pixels. Further, a material of the functional composite layer 15 is a first metal material, and the first metal material is a non-transparent material, comprising at least one of gold, silver, copper, lithium, sodium, potassium, magnesium, aluminum, and zinc.

In the present application, the organic insulating layer 16 is a high molecular polymer, and the organic insulating layer 16 is used to protect the functional composite layer 15 from external moisture and oxygen.

There is a technical problem with conventional touch display panels that antenna components need to be integrated in a middle frame of the conventional display panel and thus occupy a space inside a display device. The touch display panel 10 of the present application comprises a substrate 11, a TFT array layer 12 disposed on the substrate 11, a display layer 13 disposed on the TFT array layer 12, a thin film encapsulation layer 14 disposed on the display layer 13, a functional composite layer 15 disposed on the thin film encapsulation layer 14, and an organic insulating layer 16 disposed on the thin film encapsulation layer 14 and completely covering the functional composite layer 15. The organic light emitting layer 133 comprises a plurality of sub-pixels arranged next to each other, and each orthographic projection of the functional composite layer 15 projected on the thin film encapsulation layer 14 in the touch display panel 10 is located between two adjacent sub-pixels. The functional composite layer 15 comprises a touch pattern area and an antenna pattern area. The touch pattern area is provided with a touch pattern 151, and the antenna pattern area is provided with an antenna pattern 152. The antenna pattern 152 and the touch pattern 151 are arranged in a same layer, and the antenna pattern 152 and the touch pattern 151 are electrically insulated from each other. Such a configuration saves a space required by the antenna pattern 152, avoids placing the antenna pattern 152 in a middle frame of the display device, enables the display device to have both an antenna function and a touch function, and at the same time, improves lightness and thinness of the display device.

Second Embodiment

Figure 2:
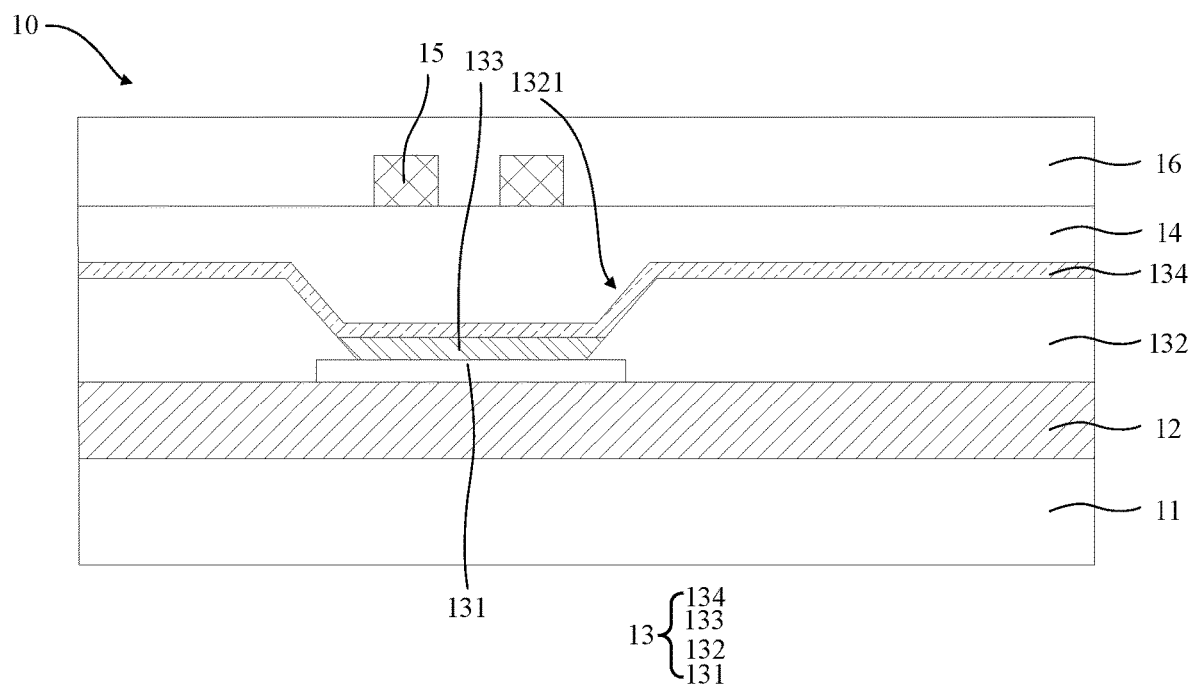
FIG. 2 is a schematic cross-sectional view illustrating a touch display panel according to a second embodiment of the present application.

FIG. 2 shows a schematic cross-sectional view of a touch display panel 10 according to the second embodiment of the present application. The touch display panel 10 according to the second embodiment of the present application comprises: a substrate 11, a thin film transistor (TFT) array layer 12 disposed on the substrate 11, a display layer 13 disposed on the TFT array layer 12, a thin film encapsulation layer 14 disposed on the display layer 13, a functional composite layer 15 disposed on the thin film encapsulation layer 14, and an organic insulating layer 16 disposed on the thin film encapsulation layer 14 and completely covering the functional composite layer 15;

wherein the functional composite layer 15 comprises a touch pattern area and an antenna pattern area, the touch pattern area is provided with a touch pattern 151, the antenna pattern area is provided with an antenna pattern 152, the antenna pattern 152 and the touch pattern 151 are arranged in a same layer, and an antenna pattern 152 is electrically insulated from the touch pattern 151.

In the present application, the second embodiment of the present application is only different from the first embodiment of the present application in that an orthographic projection of each functional composite layer 15 projected on the thin film encapsulation layer 14 is located on the corresponding sub-pixel. Furthermore, a material of the functional composite layer 15 is a second metal material, and the second metal material is a transparent material, such as an indium tin oxide film.

There is a technical problem with conventional touch display panels that antenna components need to be integrated in a middle frame and thus occupy a space inside a display device. The touch display panel 10 of the second embodiment of the present application comprises a substrate 11, a TFT array layer 12 disposed on the substrate 11, a display layer 13 disposed on the TFT array layer 12, a thin film encapsulation layer 14 disposed on the display layer 13, a functional composite layer 15 disposed on the thin film encapsulation layer 14, and an organic insulating layer 16 disposed on the thin film encapsulation layer 14 and completely covering the functional composite layer 15. The organic light emitting layer 133 comprises a plurality of sub-pixels arranged next to each other, and each orthographic projection of the functional composite layer 15 projected on the thin film encapsulation layer 14 in the touch display panel 10 is located on the corresponding sub-pixel. The functional composite layer 15 comprises a touch pattern area and an antenna pattern area. The touch pattern area is provided with a touch pattern 151, and the antenna pattern area is provided with an antenna pattern 152. The antenna pattern 152 and the touch pattern 151 are arranged in a same layer, and the antenna pattern 152 and the touch pattern 151 are electrically insulated from each other. Such a configuration saves a space required by the antenna pattern 152, avoids placing the antenna pattern 152 in a middle frame of a display device, enables the display device to have both an antenna function and a touch function, and at the same time, improves lightness and thinness of the display device.

Figure 3:
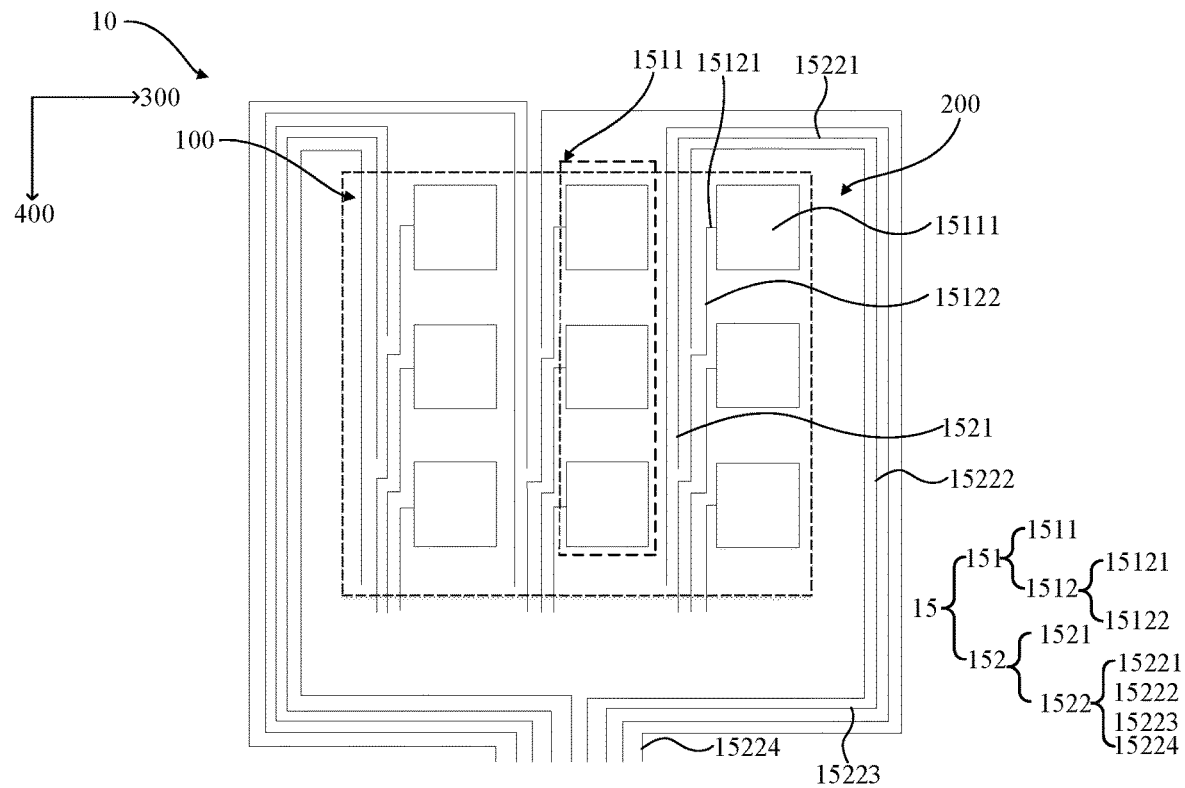
FIG. 3 is a top view illustrating the touch display panel according to one embodiment of the present application.

FIG. 3 shows a top view of the touch display panel 10 according to one embodiment of the present application. The touch display panel 10 comprises a display area 100 and a non-display area 200 arranged around the display area 100. The touch pattern 151 extends from the display area 100 to the non-display area 200.

Specifically, the touch pattern 151 comprises a plurality of touch electrode groups 1511 and a plurality of touch lines 1512. Each of the touch electrode groups 1511 comprises a plurality of touch electrodes 15111 electrically insulated from each other. Each two adjacent ones of the touch lines 1512 are electrically insulated from each other, and one of the touch lines 1512 is arranged corresponding to one of the touch electrode groups 1511 and electrically connected to one of the touch electrodes 15111 in the corresponding touch electrode group 1511.

Furthermore, the touch display panel 10 comprises the display area 100 and the non-display area 200 arranged around the display area 100. The touch electrode groups 1511 are located in the display area 100, the touch electrode groups 1511 are arranged along a first direction 300, and the touch electrodes 15111 in each of the touch electrode groups 1511 are arranged along a second direction 400. Moreover, one of the touch lines 1512 is arranged corresponding to one of the touch electrode groups 1511 and electrically connected to one of the touch electrodes 15111 in the corresponding touch electrode group 1511 through a via hole.

In the present application, the touch lines 1512 are arranged between two adjacent touch electrode groups 1511. A portion of the antenna pattern 152 is located between two adjacent touch electrode groups 1511. The touch lines 1512 are arranged between two adjacent touch electrode groups 1511, and the touch lines 1512 are electrically insulated from the antenna pattern 152.

Furthermore, the antenna pattern 152 comprises a plurality of antenna lines. Each of the antenna lines is arranged corresponding to and electrically insulated from one of the touch lines 1512.

In the above-mentioned embodiment of the present application, in the display area 100, each touch line 1512 comprises a plurality of first touch connection sections 15121 and a plurality of second touch connection sections 15122 electrically connected to the plurality of first touch connection sections 15121. The first touch connection sections 15121 are arranged along the first direction 300. One of the first touch connection sections 15121 is electrically connected to one of the touch electrodes in the corresponding touch electrode group 1511. The second touch connection sections 15122 are arranged along the second direction 400, and each two adjacent first touch connection sections 15121 are electrically connected through one of the second touch connection sections 15122.

In the present application, each antenna line comprises a first antenna connection section 1521, and the first antenna connection section 1521 extends in a direction opposite to the second direction 400. Each first antenna connection section 1521 is arranged corresponding to and insulated from the corresponding second touch connection section 15122.

In the present application, in the non-display area 200, each touch line 1512 comprises the plurality of the second touch connection sections 15122, each antenna line comprises a second antenna connection section 1522, and the second antenna connection sections 1522 are arranged in a loop around a periphery of the display area 100.

Furthermore, the second antenna connection section 1522 comprises a first sub-antenna connection section 15221, a second sub-antenna connection section 15222 electrically connected to the first sub-antenna connection section 15221, and a third sub-antenna connection section 15223 electrically connected to the second sub-antenna connection section 15222, and a fourth sub-antenna connection section 15224 electrically connected to the third sub-antenna connection section 15223. The first sub-antenna connection section 15221 extends along the first direction 300 and is located in the non-display area 200. The second sub-antenna connection section 15222 extends along the second direction 400 and is located in the non-display area 200. The third sub-antenna connection section 15223 extends in a direction opposite to the first direction 300 and is located in the non-display area 200, and the fourth sub-antenna connection section 15224 extends along the second direction 400 and is located in the non-display area 200.

In the above embodiments of the present application, in the display area 100, a distribution density of the touch lines 1512 gradually increases along the second direction 400, and a distribution density of the antenna lines gradually increases along a direction opposite to the second direction 400.

Figure 4:
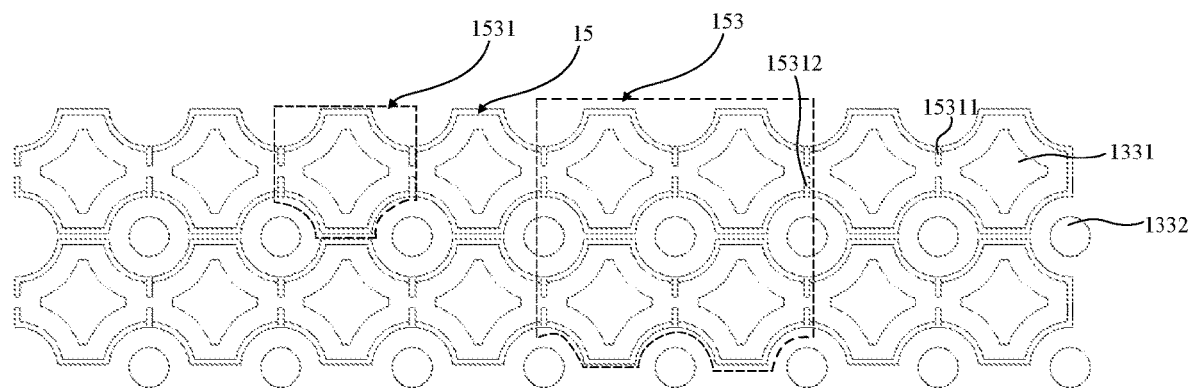
FIG. 4 is a schematic view illustrating a wiring arrangement of a functional composite layer in a non-luminous pixel area in the touch display panel according to one embodiment of the present application.

FIG. 4 shows a schematic view of a wiring arrangement of the functional composite layer 15 in a non-luminous pixel area in the touch display panel 10 according to one embodiment of the present application. In the non-luminous pixel area of the display area 100, the touch pattern 151 and the antenna pattern 152 are both a metal grid pattern.

Specifically, the touch pattern 151 and the antenna pattern 152 both comprise a plurality of grid pattern unit groups 153, and each of the grid pattern unit groups 153 includes four grid pattern units 1531 arranged in an array. The grid pattern units 1531 share a first unit connection section. The first unit connection section comprises a first sub-unit connection section 15311 and a second sub-unit connection section 15312. The first sub-unit connection section 15311 and the second sub-unit connection section 15312 are electrically insulated from each other.

The touch display panel 10 comprises a plurality of sub-pixels, the sub-pixels comprise a plurality of first sub-pixels 1331 and a plurality of second sub-pixels 1332 with a different color from the first sub-pixels 1331. Each of the grid pattern units 1531 surrounds one of the first sub-pixels 1331, and each of the grid pattern unit groups 153 surrounds one of the second sub-pixels 1332.

In the present application, a size of each second sub-pixel 1332 is smaller than a size of the first sub-pixel 1331. A portion of the touch pattern 151 or a portion of the antenna pattern 152 arranged around the second sub-pixels 1332 has a distribution density greater than a distribution density of a portion of the touch pattern 151 or a portion of the antenna pattern 152 arranged around the first sub-pixels 1331.

Furthermore, the first sub-pixels 1331 are red sub-pixels or blue sub-pixels, and the second sub-pixels 1332 are green sub-pixels. Such a design mainly serves to balance users' visual experiences.

Figure 5:
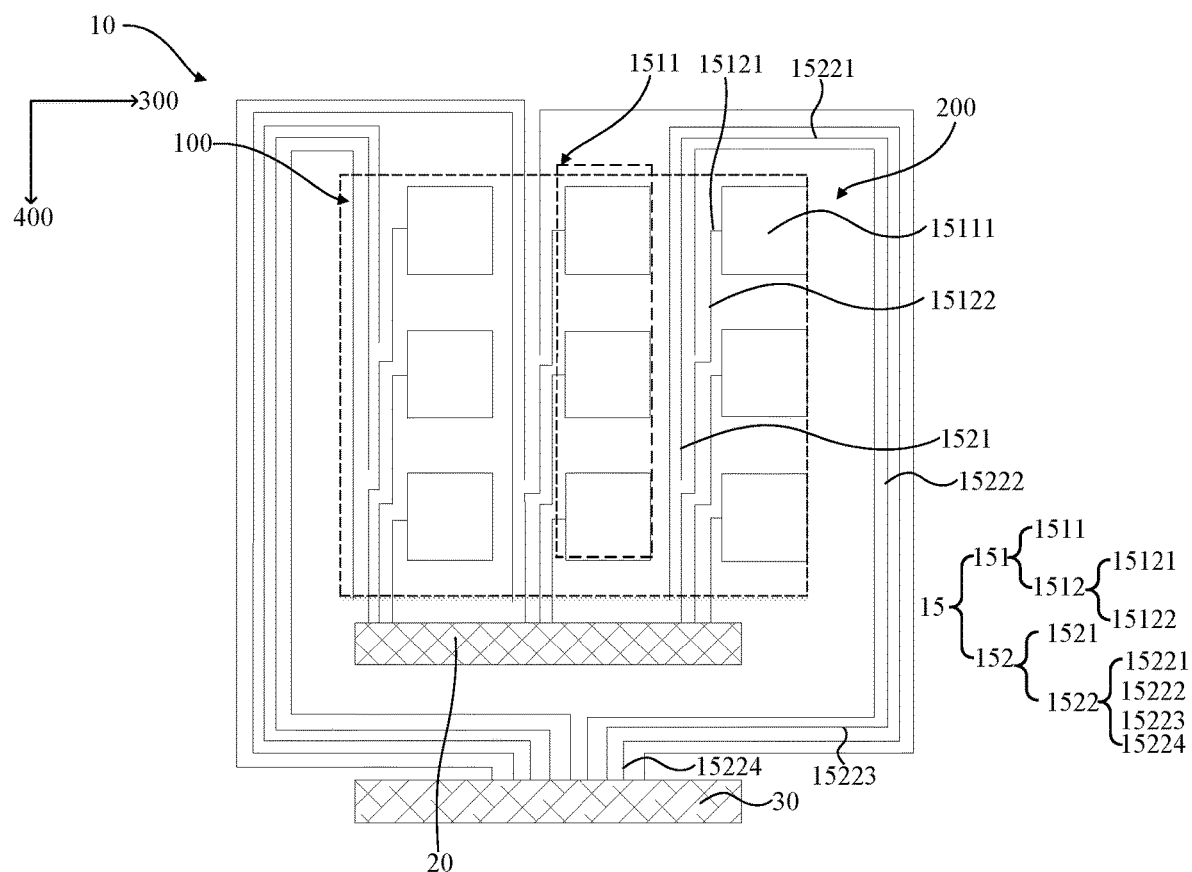
FIG. 5 is a top view illustrating a display device according to one embodiment of the present application.

FIG. 5 shows a top view of the display device according to one embodiment of the present application. The display device of the present application is mainly used in an active matrix organic electroluminescence display device, and can be extensively used in vehicles, mobile phones, tablet computers, computers, and television products.

The display device comprises the touch display panel 10 described in any one of the above embodiments, an antenna chip 30 arranged on one side of the touch display panel 10, and a touch chip 20 arranged between the touch display panel 10 and the antenna chip 30. The touch pattern 151 is electrically connected to the touch chip 20, and the touch pattern 151 is electrically connected to the antenna chip 30.

In detail, the second touch connection sections 15122 are electrically connected to the touch chip 20, and the second antenna connection sections 1522 are electrically connected to the antenna chip 30.

Figure 6:
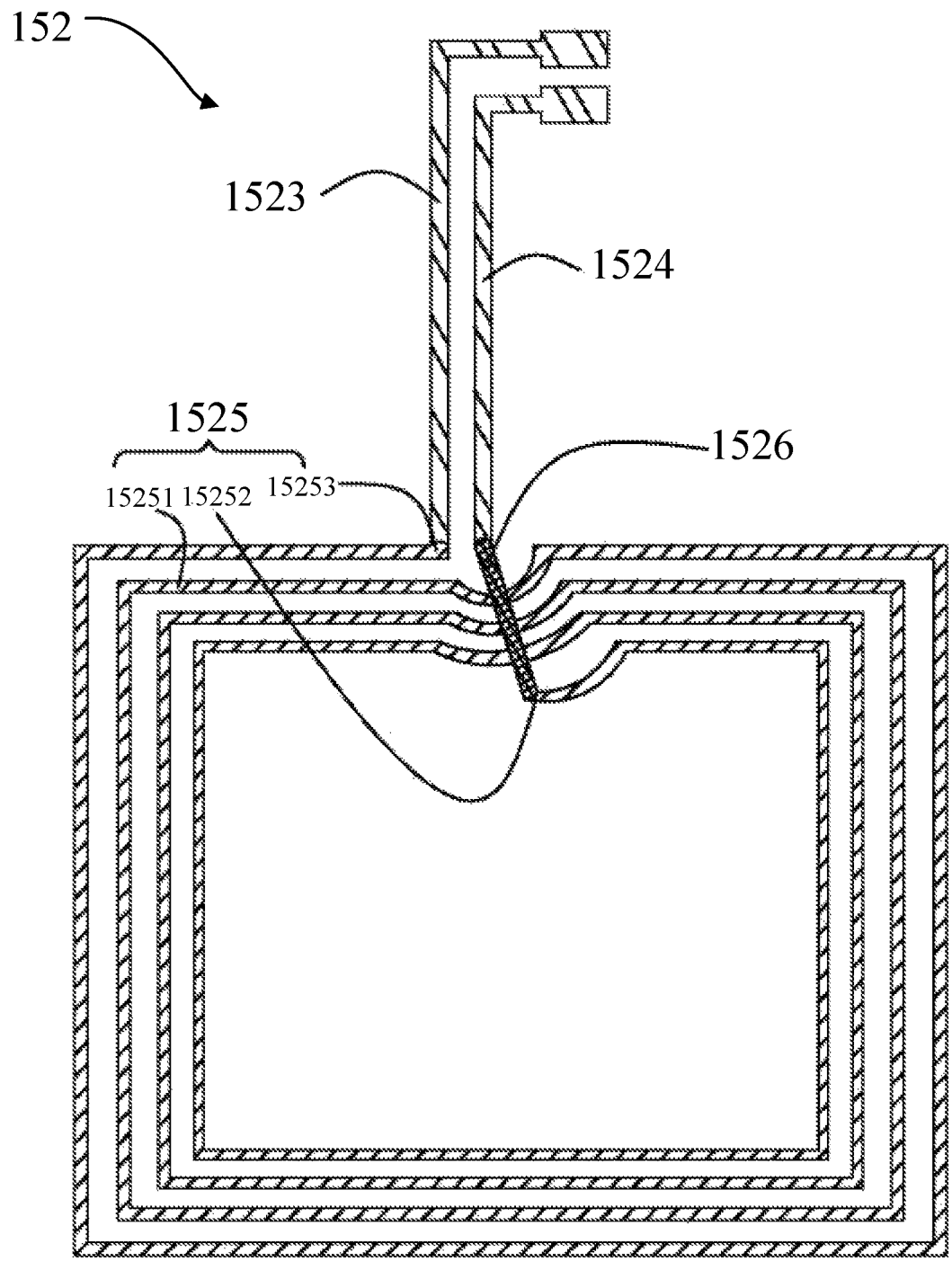
FIG. 6 is a schematic view illustrating an antenna pattern in the display device according to one embodiment of the present application.

FIG. 6 shows a schematic view illustrating the antenna pattern 152 in the display device according to one embodiment of the present application. The antenna pattern 152 comprises multiple antenna lines. The antenna lines comprise an input end 1523 and an output end 1524 electrically connected to an external circuit, and a plurality of coils 1525 electrically connected to the input end 1523 and the output end 1524. The coils 1525 comprise a head end 15251 electrically connected to the input end 1523 and located outside the coils 1525, a coil main body 15252 extending from the head end 15251, and a tail end 15253 located inside the coils 1525 and surrounded by the coil main body 15252. The antenna lines further comprise a jumper line 1526 electrically connecting the tail end 15253 and the output end 1524 and crossing the coil main body 15252. The jumper line 1526 comprises a conductive layer electrically connecting the tail end 15253 and the output end 1524.

In the present application, the input end 1523 and the output end 1524 of the antenna lines are both electrically connected to the antenna chip 30. Furthermore, the antenna line is an NFC antenna line which has a wavelength of 22 m.

Furthermore, NFC antenna technology is used for more and more applications on mobile phones. The NFC antenna technology in mobile phones mainly comprises the following application scenarios, for example, for passing through, payment, connection, browsing, and downloading.

The present application provides a touch display panel 10 and a display device. The touch display device comprises a display layer 13 and a functional composite layer 15 disposed on the display layer 13. The functional composite layer 15 comprises a touch pattern area and an antenna pattern area. The touch pattern area is provided with a touch pattern 151, the antenna pattern area is provided with an antenna pattern 152, the antenna pattern 152 and the touch pattern 151 are arranged in a same layer, and the antenna pattern 152 is electrically insulated from the touch pattern 151. Such a configuration saves a space required for the antenna pattern 152, avoids placing the antenna pattern 152 in a middle frame of the display device, enables the display device to have both an antenna function and a touch function, and at the same time, also improves lightness and thinness of the display device.

In the above-mentioned embodiments, the description of each embodiment has its own emphasis. For those that are not described in detail in one embodiment, reference can be made to related descriptions of other embodiments.

Provided above is a detailed description about a touch display panel and a display device according to the present application. Specific examples are used in the present disclosure to illustrate the working principles and embodiments of the present application. The descriptions of the above embodiments are only for ease of understanding the technical solutions and main ideas of the present application. Those of ordinary skill in the art can still modify the technical solutions described in the foregoing embodiments, or equivalently replace some of the technical features. Such modifications or replacements in corresponding technical solutions still fall within the protection scope of the embodiments of the present application.

What is claimed is:

1. A touch display panel, comprising:
a display layer and a functional composite layer disposed on the display layer, wherein the functional composite layer comprises a touch pattern area and an antenna pattern area;
wherein the touch pattern area is provided with a touch pattern, the antenna pattern area is provided with an antenna pattern, the antenna pattern and the touch pattern are arranged in a same layer, and the antenna pattern is electrically insulated from the touch pattern;
wherein in the display area, the touch pattern and the antenna pattern both comprise a plurality of grid pattern unit groups, each grid pattern unit group comprises four grid pattern units arranged in an array, the grid pattern units share a first unit connection section, the first unit connection section comprises a first sub-unit connection section and a second sub-unit connection section, and the first sub-unit connection section and the second sub-unit connection section are electrically insulated from each other; and
the touch display panel comprises a plurality of sub-pixels, the sub-pixels comprise a plurality of first sub-pixels and a plurality of second sub-pixels with a different color from the first sub-pixels, each of the grid pattern units surrounds one of the first sub-pixels, and each of the grid pattern unit groups surrounds one of the second sub-pixels.

2. The touch display panel according to claim 1, wherein the touch display panel comprises a display area and a non-display area arranged around the display area, and the touch pattern extends from the display area to the non-display area; and the touch pattern comprises a plurality of touch electrode groups, the plurality of touch electrode groups are arranged along a first direction, and a portion of the antenna pattern is located between two adjacent touch electrode groups.

3. The touch display panel according to claim 2, wherein a plurality of touch electrodes in each of the touch electrode groups are arranged along a second direction, and the touch electrodes in each of the touch electrode groups are electrically insulated from each other;
the touch pattern further comprises a plurality of touch lines, each two adjacent ones of the touch lines are electrically insulated from each other, and one of the touch lines is arranged corresponding to one of the touch electrode groups and electrically connected to one of the touch electrodes in the corresponding touch electrode group; and
the touch lines are arranged between two adjacent touch electrode groups, and the touch lines are electrically insulated from the antenna pattern.

4. The touch display panel according to claim 3, wherein the antenna pattern comprises a plurality of antenna lines, and each of the antenna lines is arranged corresponding to and electrically insulated from one of the touch lines.

5. The touch display panel according claim 4, wherein in the display area, each touch line comprises a plurality of first touch connection sections and a plurality of second touch connection sections electrically connected to the plurality of first touch connection sections, and the first touch connection sections are arranged along the first direction; one of the first touch connection sections is electrically connected to one of the touch electrodes in the corresponding touch electrode group, the second touch connection sections are arranged along the second direction, and each two adjacent first touch connection sections are electrically connected through one of the second touch connection sections;
in the display area, each antenna line comprises a first antenna connection section, and the first antenna connection section extends in a direction opposite to the second direction; and
each first antenna connection section is arranged corresponding to and electrically insulated from the corresponding second touch connection section.

6. The touch display panel according to claim 5, wherein in the non-display area, each touch line comprises the plurality of second touch connection sections, each antenna line comprises a second antenna connection section, and the second antenna connection sections are arranged in a loop around a periphery of the display area.

7. The touch display panel according to claim 4, wherein in the display area, a distribution density of the touch lines gradually increases along the second direction, and a distribution density of the antenna lines gradually increases along a direction opposite to the second direction.

8. The touch display panel according to claim 1, wherein a size of each second sub-pixel is smaller than a size of each first sub-pixel, and a portion of the touch pattern or a portion of the antenna pattern arranged around the second sub-pixels has a distribution density greater than a distribution density of a portion of the touch pattern or a portion of the antenna pattern arranged around the first sub-pixels.

9. The touch display panel according to claim 1, wherein in the display area, the touch display panel further comprises: a substrate, a thin film transistor (TFT) array layer disposed on the substrate, the display layer disposed on the TFT array layer, a thin film encapsulation layer disposed on the display layer, and an organic insulating layer disposed on the thin film encapsulation layer; and the functional composite layer is arranged between the thin film encapsulation layer and the organic insulating layer.

10. A display device, comprising:
a touch display panel, an antenna chip arranged on one side of the touch display panel, and a touch chip arranged between the touch display panel and the antenna chip;
wherein the touch display panel comprises a display layer and a functional composite layer disposed on the display layer, the functional composite layer comprises a touch pattern area and an antenna pattern area, the touch pattern area is provided with a touch pattern, the antenna pattern area is provided with an antenna pattern, the antenna pattern and the touch pattern are arranged in a same layer; and the antenna pattern and the touch pattern are electrically insulated from each other; and
the touch pattern comprises a plurality of touch lines, the antenna pattern comprises a plurality of antenna lines, each of the touch lines is electrically connected to the touch chip, and each of the antenna lines is electrically connected to the antenna chip,
wherein in the display area, the touch pattern and the antenna pattern each comprise a plurality of grid pattern unit groups, each grid pattern unit group comprises four grid pattern units arranged in an array, the grid pattern units share a first unit connection section, the first unit connection section comprises a first sub-unit connection section and a second sub-unit connection section, and the first sub-unit connection section and the second sub-unit connection section are electrically insulated from each other; and
the touch display panel comprises a plurality of sub-pixels, the sub-pixels comprise a plurality of first sub-pixels and a plurality of second sub-pixels with a different color from the first sub-pixels, each of the grid pattern units surrounds one of the first sub-pixels, and each of the grid pattern unit groups surrounds one of the second sub-pixels.

11. The display device according to claim 10, wherein the touch display panel comprises a display area and a non-display area disposed around the display area, and the touch pattern extends from the display area to the non-display area; and
the touch pattern comprises a plurality of touch electrode groups, the plurality of touch electrode groups are arranged along a first direction, and a portion of the antenna pattern is located between two adjacent touch electrode groups.

12. The display device according to claim 11, wherein a plurality of touch electrodes in each of the touch electrode groups are arranged along a second direction, and the touch electrodes in each of the touch electrode groups are electrically insulated from each other;
each two adjacent ones of the touch lines are electrically insulated from each other, and one of the touch lines is arranged corresponding to one of the touch electrode groups and electrically connected to one of the touch electrodes in the corresponding touch electrode group; and
the touch lines are arranged between two adjacent touch electrode groups, and the touch lines are electrically insulated from the antenna pattern.

13. The display device according to claim 12, wherein each of the antenna lines is arranged corresponding to and electrically insulated from one of the touch lines.

14. The display device according claim 13, wherein in the display area, each touch line comprises a plurality of first touch connection sections and a plurality of second touch connection sections electrically connected to the plurality of first touch connection sections, and the first touch connection sections are arranged along the first direction; one of the first touch connection sections is electrically connected to one of the touch electrodes in the corresponding touch electrode group, the second touch connection sections are arranged along the second direction, and each two adjacent first touch connection sections are electrically connected through one of the second touch connection sections;
in the display area, each antenna line comprises a first antenna connection section, and the first antenna connection section extends in a direction opposite to the second direction; and
each first antenna connection section is arranged corresponding to and electrically insulated from the corresponding second touch connection section.

15. The display device according to claim 14, wherein in the non-display area, each touch line comprises the plurality of second touch connection sections, each antenna line comprises a second antenna connection section, and the second antenna connection sections are arranged in a loop around a periphery of the display area.

16. The display device according to claim 13, wherein in the display area, a distribution density of the touch lines gradually increases along the second direction, and a distribution density of the antenna lines gradually increases along a direction opposite to the second direction.

17. The display device according to claim 10, wherein a size of each second sub-pixel is smaller than a size of each first sub-pixel, and a portion of the touch pattern or a portion of the antenna pattern arranged around the second sub-pixels has a distribution density greater than a distribution density of a portion of the touch pattern or a portion of the antenna pattern arranged around the first sub-pixels.

18. The display device according to claim 10, wherein in the display area, the touch display panel further comprises: a substrate, a thin film transistor (TFT) array layer disposed on the substrate, the display layer disposed on the TFT array layer, a thin film encapsulation layer disposed on the display layer, and an organic insulating layer disposed on the thin film encapsulation layer, and
the functional composite layer is arranged between the thin film encapsulation layer and the organic insulating layer.

* * * * *